Patented Mar. 12, 1946

2,396,345

UNITED STATES PATENT OFFICE 2,396,345

STABLE SULPHURIZED OILS AND THE METHOD OF PREPARING THE SAME

Thomas H. Rogers, Chicago, Ill., and Joseph S. Wallace, Hammond, Ind., assignors to Standard Oil Company, Chicago, Ill., a corporation of Indiana No Drawing. Application November 26, 1943, Serial No. 511,840

13 Claims. (Cl. 252—46.7)

The present invention relates to improvements in sulphurized oils and the methods of preparing the same, and more particularly relates to improved sulphurized petroleum oils and the method of preparing the same.

It is well known in the art to employ as cutting oils sulphurized animal and/or mineral oil products. Usually these sulphurized oils are prepared by mixing elemental sulphur with the animal and/or mineral oil and heating the mixture at an elevated temperature above about 300° F. for a period of time sufficient to obtain a product having the desired sulphur content. Such sulphurized oils are objectionable in that they are unstable and are susceptible to sedimentation, frequently amounting to 1% to 4%. This is an undesirable quality in sulfurized cutting oils, since they are often used in large plants where circulating systems and tanks are employed in their distribution and the formation of sediment in such unstable oils often blocks the circulating lines and in other ways interferes with normal performance. Although substantially all of the initial sediment may be removed by mechanical means, such as by filtration, additional sediment forms upon aging of the sulphurized oil.

It is an object of the present invention to provide a stable non-emulsifiable sulphurized oil which is resistant to the formation of sediment. Another object of the invention is to provide a sulphurized mineral oil which is substantially free of sediment. Another object of the invention is to provide an improved method of preparing stable sulphurized oils. Another object of the invention is to provide a method of inhibiting the formation of sediment in sulphurized oils.

We have discovered that the foregoing objects can be attained by our improved method of preparing sulphurized oils. In accordance with the present invention, the oil to be sulphurized, for example, a mineral oil of the desired viscosity, is mixed with about 2% to about 8%, and preferably with about 4% to about 6% of pulverized elemental sulphur, and the mixture heated at a temperature within the range of about 300° F. to about 360° F., and preferably within the range of about 335° F. to about 345° F. for a period of time sufficient to obtain a sulphurized oil having the desired sulphur content, usually from about 10 hours to about 15 hours, preferably from about 12 hours to about 13 hours. At the end of the heating period the sulphurized oil is preferably cooled to a temperature of from about 175° F. to about 225° F. and preferably to a temperature within the range of about 190° F. to about 210° F., and a small amount of a complex glyceride phosphoric acid ester such as natural and synthetic phosphatides, for example lecithin, cephalin and mixed phosphatides derived from soya bean oil or other sources, is added to the sulphurized oil. The amount of the complex glyceride phosphoric acid ester employed is within the range of about 0.001% to about 2% and preferably within the range of about 0.005% to about 1%. While we prefer to add the complex glyceride phosphoric acid ester to the sulphurized oil after it has been cooled as above indicated, we can add the phosphatidic material to the sulphurized oil before any substantial cooling.

If desired the odor of the sulphurized oil may be improved by blowing the same after it has been cooled to about 200° F. with a gas, such as air, for a period of about 30 minutes to about 90 minutes and preferably for a period of about 45 to 60 minutes. In case the sulphurized oil is air-blown the phosphatide is suitably added during the blowing period. Still further odor improvement may be obtained by adding a small amount; namely about 0.1%, of triethanolamine to the sulphurized oil when the temperature has dropped below 150° F.

The amount of sediment which is present and which may possibly form on aging is reduced by at least 50% and in most cases by at least about 75% when the sulphurized oils are prepared in the manner described. In practically all cases the total sediment amounts to less than 1%.

The following example is purely illustrative of the present invention and is not intended to be limitative thereof.

To 100 gallons of a mineral oil having a Saybolt Universal viscosity at 100° F. of about 100 seconds were added 32 pounds of flowers of sulphur and the mixture heated in a still at a temperature of 340–350° F. for 12 hours. At the end of the sulphurization period the contents of the still were cooled to about 200° F. and blown with air for about 45 minutes, during which time about 2 pounds of lecithin were added to the sulphurized oil. At the end of the blowing period after the temperature dropped to about 150° F., about 0.1% triethanolamine was added to inhibit odor development.

The effectiveness of the herein described method of preparing stabilized sulphurized oils is demonstrated by the data in the following table. The data show the amount of sediment found in sulphurized oil prepared by the conventional methods and in accordance with the present invention with 2.0% lecithin and with 0.25% lecithin, immediately after sulphurization and after 30 to 35 days' storage. Oil A was a 110 second viscosity (S. U. at 100° F.) oil, Oil B was a 150 second viscosity (S. U. at 100° F.) oil, and Oil C was a 200 second viscosity (S. U. at 100° F.) oil.

| Method of sulphurization | Oil A; sedimentation [1] | | Oil B; sedimentation [1] | | Oil C; sedimentation [1] | |
|---|---|---|---|---|---|---|
| | Fresh | 34 days | Fresh | 30 days | Fresh | 35 days |
| Conventional | 0.9 | 2.1 | 1.3 | 1.4 | 3.5 | 4.5 |
| With 2% lecithin | 0.4 | 0.4 | 0.4 | 0.4 | 1.2 | 2.5 |
| With 0.25% lecithin | | 0.4 | | 0.4 | | 2.2 |

[1] Volume per cent.

The above data show the effectiveness of a phosphatide in inhibiting sedimentation in sulphurized oils.

If desired, a small amount of a phenolic compound, such as phenol or a chlorophenol, may be added to the composition to stabilize the phosphatidic material.

The stabilized sulphurized oil prepared in accordance with the present invention is the type which is not readily or permanently emulsifiable with water, that is, it is not a so-called soluble oil type. The term "non-emulsifiable sulphurized oil" as used herein and in the appended claims means a sulphurized oil which is not readily or permanently emulsified with water.

While specific ranges and proportions have been given for the purpose of illustration the invention is not limited thereto, but is of the scope of the following claims.

We claim:

1. The method of preparing a stable sulphurized mineral oil comprising sulphurizing the oil with elemental sulphur at a temperature from about 300° F. to about 360° F. and adding to the sulphurized oil a complex glyceride phosphoric acid ester in a small but sufficient amount to inhibit the formation of sediment in the sulphurized oil.

2. The method of preparing a stable sulphurized mineral oil comprising sulphurizing the oil with elemental sulphur at a temperature from about 300° F. to about 360° F., cooling the sulphurized oil to a temperature of about 200° F. and adding to the sulphurized oil a complex glyceride phosphoric acid ester in small but sufficient amount to inhibit the formation of sediment in the sulphurized oil.

3. The method described in claim 2 in which the complex glyceride phosphoric acid ester is a phosphatide.

4. The method described in claim 2 in which the complex glyceride phosphoric acid ester is lecithin.

5. The method described in claim 2 in which the complex glyceride phosphoric acid ester is cephalin.

6. The method of preparing a stable sulphurized mineral oil comprising sulphurizing the oil with elemental sulphur at a temperature from about 300° F. to about 360° F., blowing the sulphurized oil with a gas and adding a small amount of a phosphatide to the sulphurized oil.

7. The method described in claim 6 in which the phosphatide is lecithin.

8. The method of preparing a stable sulphurized mineral oil comprising sulphurizing the mineral oil at a temperature within the range of about 300° F. to about 360° F. with elemental sulphur, cooling the sulphurized mineral oil to a temperature of about 175° F. to about 225° F. and adding from about 0.001% to about 2% of a phosphatide.

9. The method of preparing a stable sulphurized mineral oil inhibited against sedimentation comprising sulphurizing a mineral oil at a temperature within the range of from about 300° F. to about 360° F. with elemental sulphur, cooling the sulphurized oil to a temperature of from about 175° F. to about 225° F., blowing the cooled sulphurized oil with a gas and adding from about 0.001% to about 2% of lecithin to the sulphurized oil during the gas blowing period.

10. A stable non-emulsifiable sulphurized mineral oil composition comprising a sulphurized mineral oil prepared by reacting a mineral oil with elemental sulphur at a temperature from about 300° F. to about 360° F., and a complex glyceride phosphoric acid ester added to said sulphurized mineral oil at a temperature not greater than about 200° F. said complex glyceride phosphoric acid ester being added in small but sufficient amounts to inhibit the formation of sedimentation and the separation of sulphur in said sulphurized mineral oil.

11. A stable non-emulsifiable sulphurized mineral oil composition as described in claim 10 in which the complex glyceride phosphoric acid ester is a phosphatide.

12. A stable non-emulsifiable sulphurized mineral oil composition as described in claim 10 in which the complex glyceride phosphoric acid ester is lecithin.

13. A stable non-emulsifiable sulphurized mineral oil composition as described in claim 10 in which the complex glyceride phosphoric acid ester is employed in amounts of from about 0.001% to about 2%.

THOMAS H. ROGERS.
JOSEPH S. WALLACE.